(12) United States Patent
Stockdell (10) Patent No.: US 8,429,742 B2
(45) Date of Patent: Apr. 23, 2013

(54) DETECTION OF A DENIAL OF SERVICE ATTACK ON AN INTERNET SERVER

(75) Inventor: William Maupin Stockdell, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1737 days.

(21) Appl. No.: 11/735,556

(22) Filed: Apr. 16, 2007

(65) Prior Publication Data

US 2008/0256632 A1    Oct. 16, 2008

(51) Int. Cl.
  *G06F 11/30* (2006.01)
(52) U.S. Cl.
  USPC ............................................ 726/22; 709/228
(58) Field of Classification Search ............... 726/22; 709/228
  See application file for complete search history.

(56) References Cited

U.S. PATENT DOCUMENTS

| 6,823,387 | B1 * | 11/2004 | Srinivas | 709/227 |
| 7,137,144 | B1 | 11/2006 | Attwood | |
| 7,266,754 | B2 * | 9/2007 | Shah et al. | 714/776 |
| 2005/0010817 | A1 * | 1/2005 | Jakubik et al. | 713/201 |
| 2005/0039104 | A1 * | 2/2005 | Shah et al. | 714/776 |
| 2005/0050358 | A1 * | 3/2005 | Lin | 713/201 |
| 2006/0107324 | A1 | 5/2006 | Chirra et al. | |
| 2006/0230129 | A1 * | 10/2006 | Swami et al. | 709/223 |
| 2006/0282537 | A1 * | 12/2006 | Venkatsubra et al. | 709/228 |

\* cited by examiner

*Primary Examiner* — Jeffrey Pwu
*Assistant Examiner* — Samuel Ambaye
(74) *Attorney, Agent, or Firm* — Martin & Associates LLC; Bret J. Petersen (57) ABSTRACT

An apparatus and method to detect a denial of service attack on an internet server by a hacker or malevolent software while effectively distinguishing an attack from a spike in demand by legitimate users of the server. In preferred embodiments, the kernel's TCP implementation is modified to hold back sending a reset (RST) to terminate the connection and to make an entry into a dead connection list when a connection attempt is dropped off of an overflowing accept queue. The entries are removed from the dead connection list when they become stale or an ACK is received corresponding to the entry. Additional TCP kernel parameters include a monitor enable to turn on or off the DoS monitor, a monitor threshold to determine when to send an alarm, and a stale time that is a timeout value to determine when to remove entries from the dead connection list.

20 Claims, 5 Drawing Sheets

DETECTION OF A DENIAL OF SERVICE ATTACK ON AN INTERNET SERVER

BACKGROUND

1. Technical Field

This invention generally relates to protection of internet servers, and more specifically relates to an apparatus and method for detection of a denial of service attack on an internet server.

2. Background Art

Denial of Service (DoS) attacks are a common type of computer crime that disrupt a network server and cause both networking problems and financial damage to owners of an internet server. The attack is orchestrated by individuals, sometimes called hackers, that want to disrupt the internet servers of a company or organization. The oldest and most common form of DoS attack is the SYN-flood. A SYN flood is a network transport layer attack that takes advantage of the protocols used to establish connections over Transmission Control Protocol (TCP). Communication between a client and a server (or two hosts) is typically done using TCP to make a connection between the client and server. When a TCP connection is started, the two machines that are involved exchange a series of brief messages called a "handshake". This handshake consists of the client sending a synchronization (SYN) message, the server sending a SYN and an acknowledge (ACK) message and the client finishing with a final ACK message. At the reception of the final ACK message both sides of the connection are ready to communicate.

In a SYN flood, a client (or many clients in a distributed attack) will send large numbers of SYN messages with spoofed source addresses and ports. Since the source addresses and ports are spoofed, there will never be a final ACK to the server. Responding to the large number of SYN messages uses up networking bandwidth, CPU, and memory on the server making it harder for legitimate users to access the server. Before countermeasures were developed, this could also crash the server by using up all of the system's memory.

A number of algorithms for dealing with a SYN flood have been developed. These include random dropping of incomplete connections when a predefined backlog is full, SYN cacheing using a global hash table, firewall based solutions to proxy the server and preserve its resources under an attack, and leaf node router solutions that intercept the attacks at the source. All of these countermeasures help mitigate the problem but none of them are able to distinguish between a demand spike and a true DoS attack.

A demand spike is a sudden increase in legitimate server traffic. Normally servers can expect to have somewhat predictable demand curves. Sometimes, however, connection requests far exceed the planned server capacity and look functionally identical to DoS attacks. A typical reason for a demand spike is a link from a popular news site or blog. In order to take the appropriate action, it is useful for the internet administrators to know whether a sudden increase in server traffic is a DoS attack or just a demand spike.

Without a way to more effectively detect a DoS attack compared to a demand spike, internet administrators will continue to be unable to properly respond to a DoS attacks and demand spikes.

BRIEF SUMMARY

An apparatus and method is described for detection of a denial of service attack on an internet server by a hacker or malevolent software while effectively distinguishing a spike in demand by legitimate users of the server. In preferred embodiments, the kernel's TCP implementation is modified to hold back sending a reset (RST) to terminate the connection and to make an entry into a dead connection list when a connection attempt is dropped off of an overflowing accept queue. The entries are removed from the dead connection list when they become stale or an ACK is received corresponding to the entry. Additional TCP kernel parameters to support the DoS monitor and the dead connection list include a monitor enable to turn on or off the DoS monitor, a monitor threshold to determine when to send an alarm, and a stale time that is a timeout value to determine when to remove entries from the dead connection list.

The description and claims herein are directed to a generic computer architecture and thus could be implemented on any internet server computer system that supports TCP, or similar handshaking protocols.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION

The disclosure and claims herein are directed to an apparatus and method to detect a denial of service attack on an internet server while effectively distinguishing an attack from a spike in demand by legitimate users of the server. In preferred embodiments, the kernel's TCP implementation is modified to hold back sending the RST and make an entry into a dead connection list when a connection attempt is dropped off of the accept queue. The entries are removed from the dead connection list when they become stale or a ACK is received corresponding to the entry.

Figure 1:
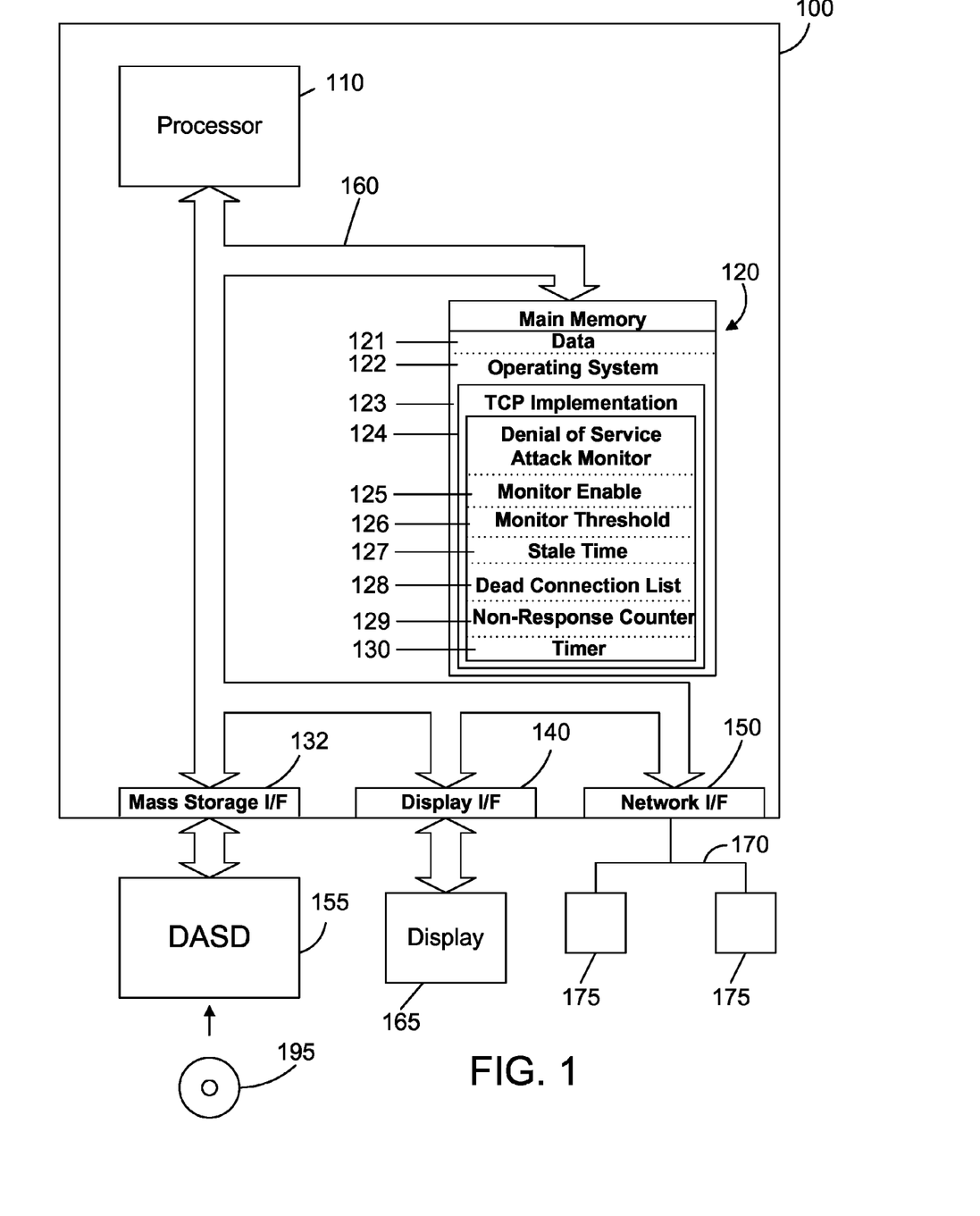
FIG. 1 is a block diagram of a computer system with a denial of service attack monitor as described herein.

Referring to FIG. 1, a computer system 100 is one suitable implementation of the apparatus and method described herein. Computer system 100 is an IBM eServer System i computer system. However, those skilled in the art will appreciate that the methods and apparatus described herein apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 132, a display interface 140, and a network interface 150. These system components are interconnected through the use of a system bus 160. Mass storage interface 132 is used to connect mass storage devices, such as a direct access storage device 155, to computer system 100. One specific type of direct access storage device 155 is a readable and writable CD-RW drive, which may store data to and read data from a CD-RW 195.

Main memory 120 contains data 121, an operating system 122, a TCP kernel 123, a DoS attack monitor 124, a monitor enable 125, a monitor threshold 126, a stale time 127, a dead connection list 128, a non-response counter 129, and a timer 130. Data 121 represents any data that serves as input to or output from any program in computer system 100. Operating system 122 is a multitasking operating system known in the industry as i5/OS; however, those skilled in the art will appreciate that the spirit and scope of this disclosure and claims are not limited to any one operating system. The DoS attack monitor 124 is the mechanism for detection of a denial of service attack on an internet server as described herein. The monitor enable 125, the monitor threshold 126, and the stale time 127 are additional TCP parameters for controlling the operation of the DoS attack monitor 124. The dead connection list 128 stores a record of the discarded connection attempt sufficient to uniquely identify it (source and destination ip addresses and ports and next expected sequence number) and a timestamp indicating when it was released from the accept queue. The kernel's TCP implementation 123, the DoS attack monitor 124, the monitor enable 125, the monitor threshold 126, the stale time parameter 127, the dead connection list 128, the non-response counter 129, and the timer 130 are each described in more detail in the paragraphs below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and the other memory elements discussed above are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that denial of service attack monitor described herein may be practiced using a computer system that has multiple processors and/or multiple buses. In addition, the interfaces that are used preferably each include separate, fully programmed microprocessors that are used to offload compute-intensive processing from processor 110. However, those skilled in the art will appreciate that the credit card verifier described herein applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The DoS attack monitor 124 described herein applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the DoS attack monitor has been and will continue to be described in the context of a fully functional computer system, those skilled in the art will appreciate that the DoS attack monitor described herein is capable of being distributed as an article of manufacture in a variety of forms, and that the claims extend to all types of computer-readable media used to actually carry out the distribution. Examples of suitable computer-readable media include: recordable media such as floppy disks and CD-RW (e.g., 195 of FIG. 1).

Figure 2:
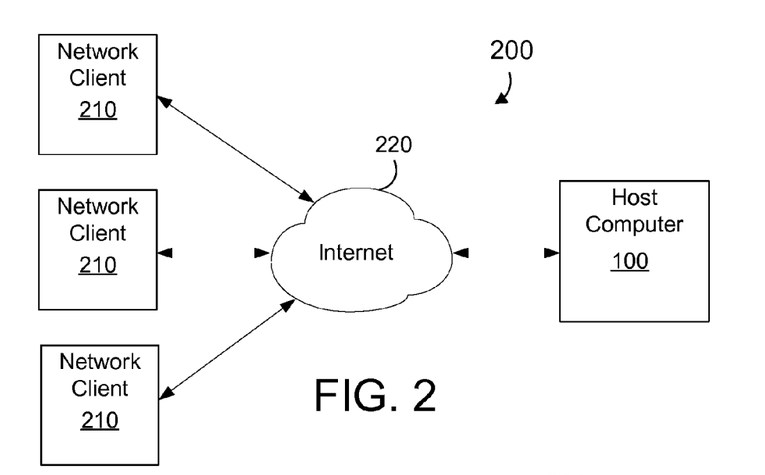
FIG. 2 is a block diagram of a computer network with a host server and multiple network clients.

FIG. 2 illustrates a block diagram of a computer network 200. The computer network 200 includes a number of network clients 210 connected to the internet 220. The network clients 210 represent any computer that makes requests over the internet 220 to the host computer 100 that provides a network server to the network client 210. The network clients 210 may be another host computer, a home computer, laptop, cell phone, PDA or any other device that connects to the internet 220. The network uses the industry standard Transmission Control Protocol TCP for network communication. TCP is a reliable, connection-oriented communication protocol standardized by the IETF (Internet Engineering Task Force).

As introduced above, TCP defines a handshaking procedure for establishing connections over the internet. The handshaking procedure is typically described using the common acronyms of SYN, ACK and RST. SYN is short for 'synchronize' and it is a flag in a packet used to indicate a TCP connection request from a client to a server. Similarly, RST is short for 'reset', and is a flag in packet which indicates that a connection is abnormally terminated. ACK is short for 'acknowledge', which is a flag in a packet used as a response to indicate reception of a previous packet. Thus, in a TCP handshake, the client first sends a SYN, and the server responds by sending a SYN and an ACK to the client. The clients client completes the handshake by sending a final ACK in response to the server's SYN. Until this handshake is not complete, there is no valid connection. When a SYN is received, the handshake information is used to create a four tuple for the pending TCP connection. The four tuple is a set of data containing remote and local IP addresses and remote and local ports that uniquely identifies the TCP connection.

Figure 3:
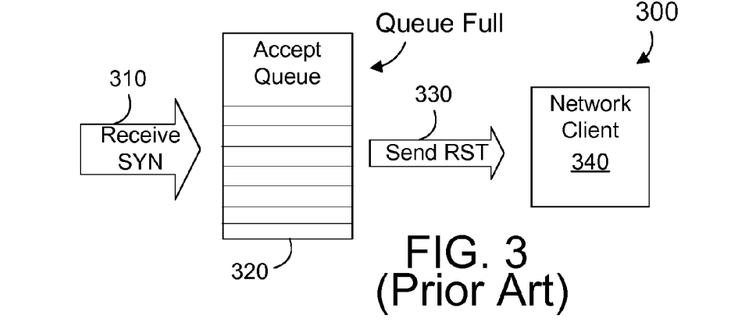
FIG. 3 illustrates a block diagram of processing a SYN packet according to the prior art.

FIG. 3 shows a block diagram that demonstrates how a prior art host server using the TCP protocol attempts to overcome a DoS attack. The prior art TCP kernel receives new connection attempts as indicated by the incoming SYN packets 310. When the new connection attempts arrive faster than the server application can service them, the new connection attempts are buffered in an accept queue 320. When the accept queue 320 reaches its maximum length and is full, the system throws away selected pending connections from the accept queue. When the selected pending connections are removed from the queue 320 a RST packet 330 is returned by the host to the client making the SYN request. Thus in the typical scenario of a SYN flood, the accept queue is filled to capacity and then incomplete connection attempts are removed from the accept queue to accommodate new SYN requests and RST packets are sent to the client for the purged requests. While this common approach will protect from a SYN flood, it does not distinguish a demand spike from a SYN flood.

Figure 4:
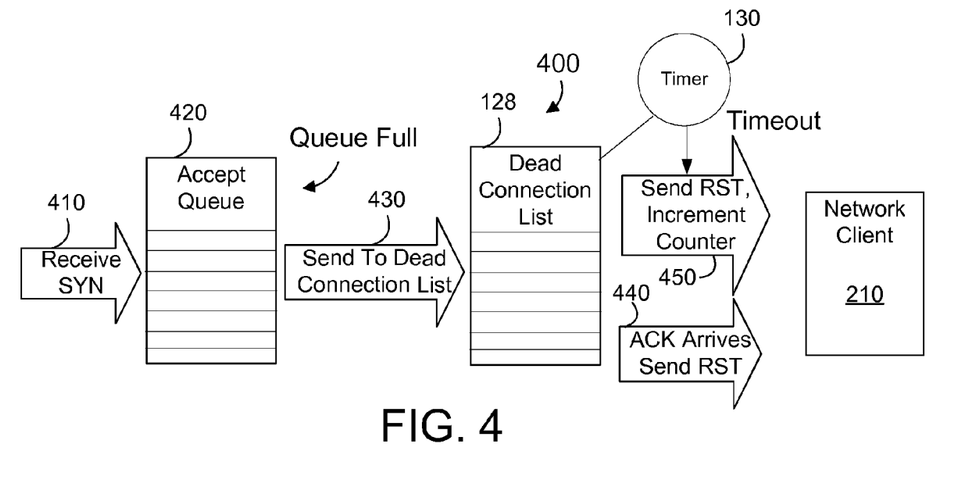
FIG. 4 is a method flow diagram of processing a SYN packet as claimed herein.

FIG. 4 represents a block diagram to illustrate the operation of a denial of service attack monitor 124 (FIG. 1) as claimed herein. The denial of service attack monitor is preferably a kernel level extension to TCP. The denial of service attack monitor works on the principle that bogus connection attempts during a SYN flood do not and can not send a final ACK with a correct sequence number to indicate a completed connection. Thus a large number of such attempts indicate that a DoS attack is in progress rather than a demand spike or normal network loss is at fault. An RST is not sent in response to the SYN until the pending connections are removed from the dead connection list 128.

Again referring to FIG. 4, the kernel's TCP implementation receives new connection attempts as indicated by the incoming SYN packets 410. When the new connection attempts arrive faster than the server application can service them, the new connection attempts are buffered in an accept queue 420. When the accept queue 420 reaches its maximum length and is full, the denial of service attack monitor 124 (FIG. 1) removes 430 the pending connections from the accept queue 420 and creates entries in the dead connection list 128 for the removed pending connections. The entries in the dead connection list 128 includes a time stamp when the entry is created and the four tuple of information concerning the pending connection. Alternatively, the entry in the dead connection list could include a pointer to the four tuple of the pending connection.

Entries of pending connections are removed from the dead connection list 128 in two ways. First, an entry is removed when a valid ACK arrives 440 from client 210 for a pending connection SYN in the dead connection list 128. When the entry is removed, a RST is also sent aborting the connection since the connection is not in a state from which it can be rescued. Second, an entry in the dead connection list 128 is removed and a RST packet 450 is returned by the host when the entry is determined to be stale. The entry is stale when it has been on the dead connection list 128 longer than the preset stale time 127. The preset stale time 127 can be set by the system administrator. A good default time for the stale time is twice the maximum segment lifetime (2MSL) used in TCP. The dead connection list is periodically processed using the timer 130 to determine which entries have been on the list longer than the stale time 127 and are therefore stale entries. When the stale entries are removed from the dead connection list 128, a RST is sent to the client, and the non-response counter 129 is incremented at 450. If the non-response counter exceeds the monitor threshold 126, then an alarm is raised which could be used to alert an system administrator or trigger an automated response such as adding server capacity.

Entries on the dead connection list are held until an ACK is received or until they are stale as described above. At either time, when the entry is removed from the dead connection list, an RST is sent. Holding entries in the dead connection list for a time period before sending out an RST insures that if any of these entries are from legitimate connection attempts, they will likely be removed when an ACK is received. If the RST were sent without waiting for an ACK they could be counted as false negative on the non-response counter. A false negative could occur if a RST was sent immediately and arrived at the client before an ACK is sent such that the client would not send a final ACK. In this case, the legitimate connection attempt would appear the same as an illegitimate connection attempt. If there were many false negatives, the DoS attack monitor would not give accurate information to the system administrator concerning the nature of the spike in demand on the server.

Figure 5:
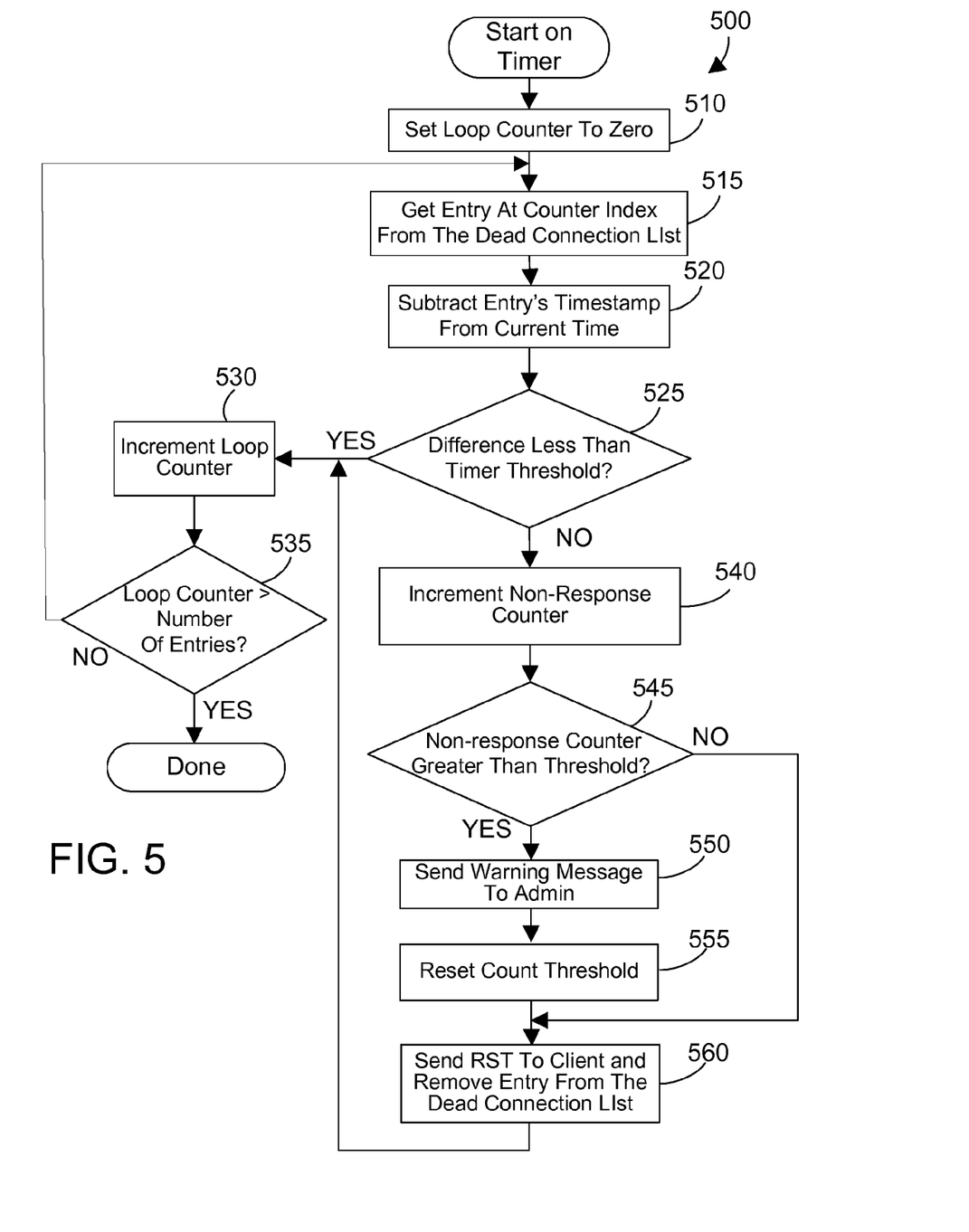
FIG. 5 is a method flow diagram for processing entries in a dead counter list.

FIG. 5 illustrates a method 500 for a DoS attack monitor for processing entries in the dead connection list described above. This method operates on an internet host computer system 100 described above with reference to FIG. 1. The method 500 periodically processes the entries on the dead counter list to determine those that have been on the list for a time greater than the stale time 127 (FIG. 1). The period for processing the entries on the dead counter list could also be managed by the system administrator to control the efficiency and performance of the overall host computer system 100.

The method 500 begins by setting a loop counter to zero (step 510). The loop counter is used to count through the entries in the dead connection list. Next, get an entry from the dead connection list at the location of the loop counter (step 510) then subtract the entry's timestamp from the current time (step 520). If the difference between the timestamp and the current time is less than the timer threshold (step 525=yes), then increment the loop counter (step 530). If the loop counter is greater than the number of entries in the dead connection list (step 535=yes), then the method is done. If the loop counter is not greater than the number of entries in the dead connection list (step 535=no), then return to step 515 to process the next entry in the dead connection list. If the difference between the timestamp and the current time is greater than the timer threshold (step 525=no), then increment the non-response counter (step 540). If the non-response counter has a value that is greater than the monitor threshold (step 545=yes), then send a warning message to the system administrator (step 550), reset the count threshold (step 555) and send an RST to the client and remove the entry from the dead connection list (step 560) and continue with step 530. If the non-response counter has a value that is not greater than the monitor threshold (step 545=no), then send an RST to the client and remove the entry from the dead connection list (step 560) and continue with step 530.

Figure 6:
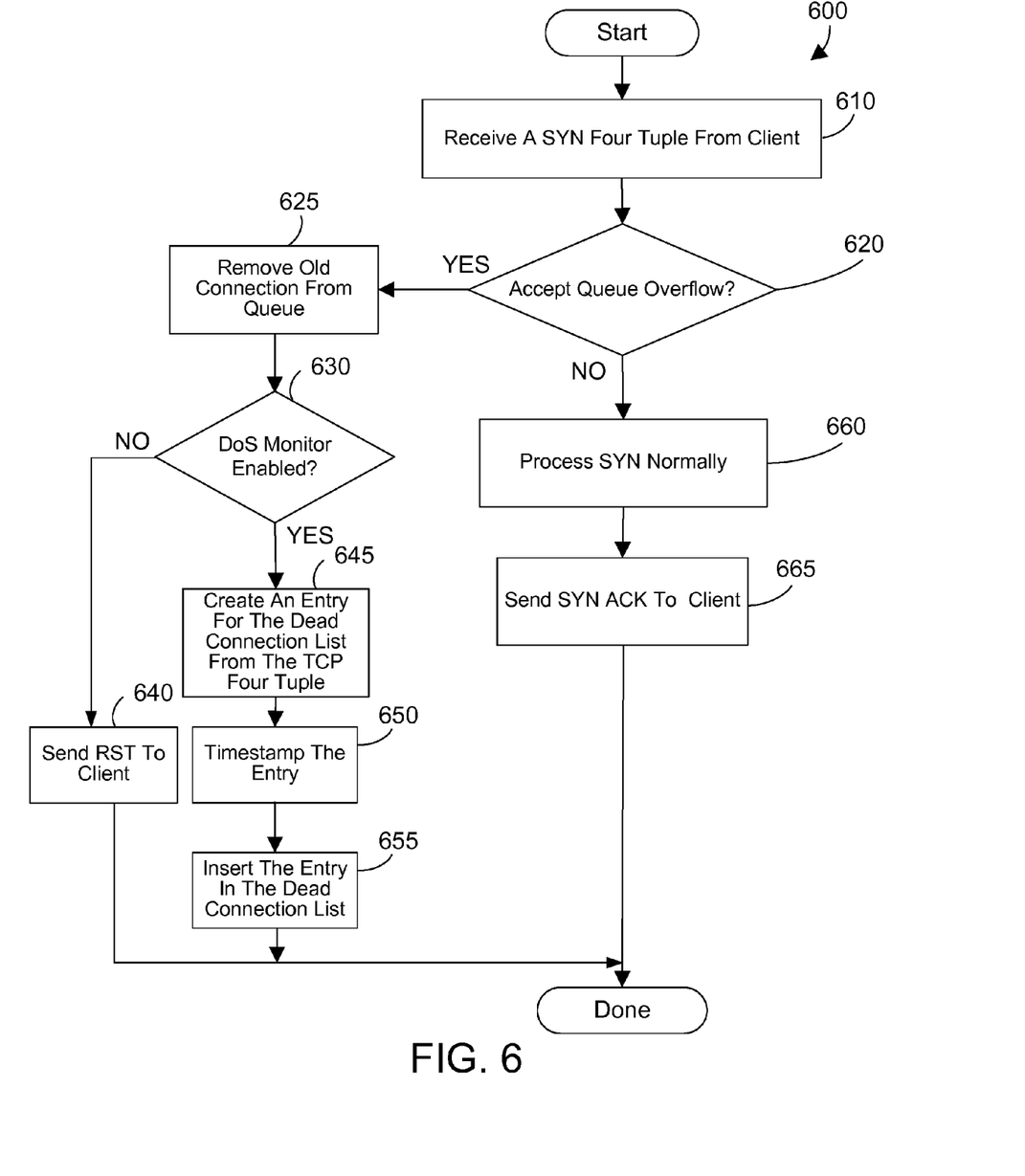
FIG. 6 is a method flow diagram for handling SYN requests from a client as claimed herein.

FIG. 6 illustrates a method 600 for a DoS attack monitor to process a SYN request from a client. This method operates on an internet host computer system 100 described above with reference to FIG. 1. The method 600 begins by receiving a SYN from the client (step 610). If the accept queue is overflowing (step 620=yes) then remove an old incomplete connection from the accept queue (step 625). Then check if the DoS monitor is enabled (step 630). If the DoS monitor is not enabled (step 630=no) then send RST to the client to abort the incomplete communication removed from the accept queue (step 640) and the method is done. If the DoS monitor is enabled (step 630=yes) then create an entry for the dead connection list using the information (four tuple) from the SYN received from the client for the incomplete connection removed from the accept queue (step 645), then time stamp the entry (step 650) and insert the entry in the dead connection list (step 655); and then the method is done. If the accept queue is not overflowing (step 620=no) then process the SYN normally in the kernel's TCP implementation (step 660) and send an SYN_ACK to the client (step 665). The method is then done.

Figure 7:
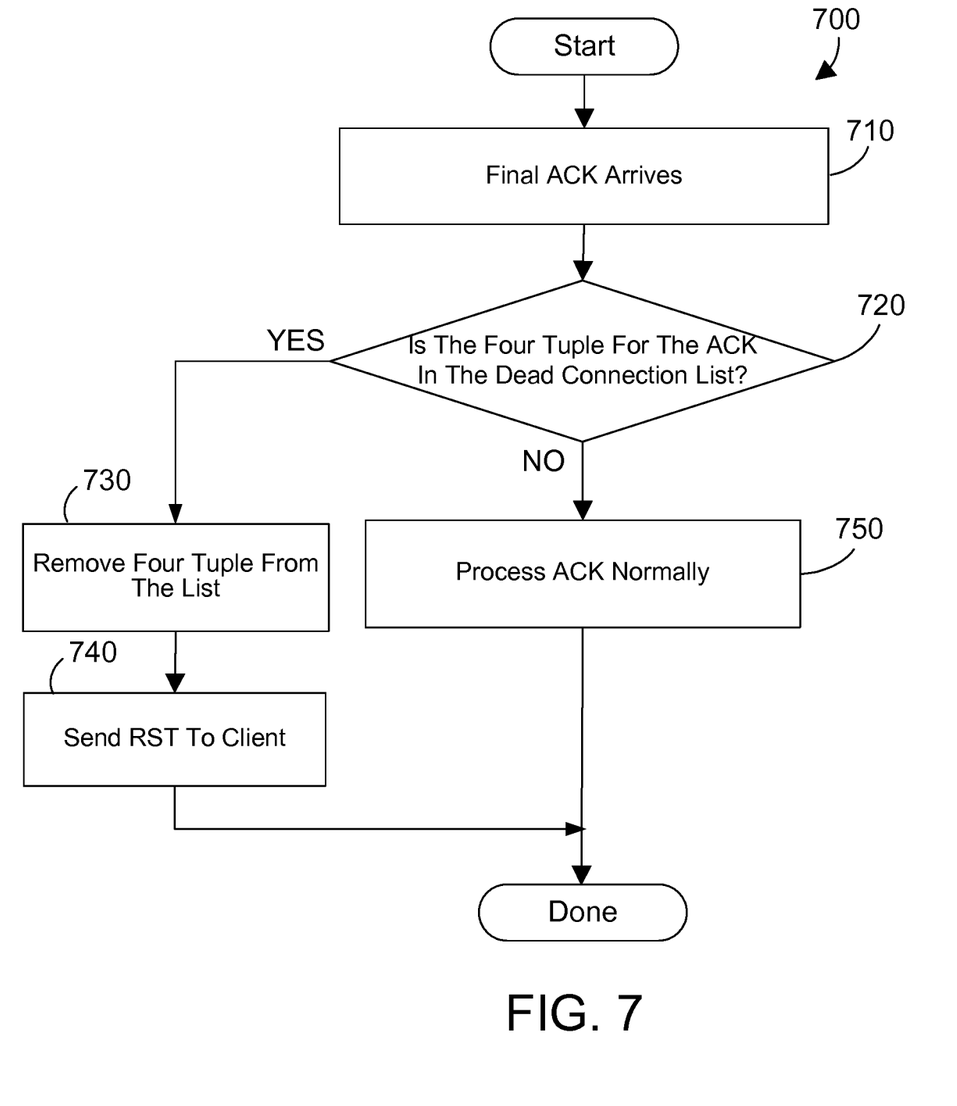
FIG. 7 is a method flow diagram for handling ACK requests from a client as claimed herein.

FIG. 7 illustrates a method 700 for a DoS attack monitor to process final ACKs in TCP. This method also operates on an internet host computer system 100 described above with reference to FIG. 1. The method 700 begins by receiving a final ACK from the client (step 710). If the four tuple for the ACK is in an entry in the dead connection list (step 720=yes) then remove the entry for the four tuple in the dead connection list (step 730) and send a RST to the client to abort the communication (step 740). If the four tuple for the ACK is not in the dead connection list (step 720=no) then process the ACK normally according to the prior art (step 750). The method is then done.

The disclosure herein describes a method and apparatus to detect a denial of service attack on an internet server while effectively distinguishing an attack from a spike in demand by legitimate users of the server. A DoS attack monitor allows a system administrator to better control resources by being able to distinguish a DoS attach from a spike in demand for internet resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer apparatus comprising:
   at least one processor;
   a memory coupled to the at least one processor;
   an operating system with a transmission control protocol (TCP) kernel that provides a server to communicate with clients over an network connection; and
   a denial of service monitor (DoS monitor) that distinguishes between a denial of service attack and a demand spike by using a plurality of connection attempts to make a plurality of entries into a dead connection list when an accept queue is full, and holding back sending a reset (RST) by the kernel's TCP implementation until a corresponding entry of the plurality of entries is removed from the dead connection list.

2. The computer apparatus of claim 1 wherein the corresponding entry of the plurality of entries is removed from the dead connection list when an acknowledge (ACK) is received corresponding to the entry.

3. The computer apparatus of claim 1 wherein the corresponding entry of the plurality of entries is removed from the dead connection list when the at least one entry has been in on the dead connection list for more than a specified stale time.

4. The computer apparatus of claim 3 wherein the DoS monitor increments a non-response counter each time the corresponding entry is removed from the dead connection list after being on the dead connection list for more than the specified stale time.

5. The computer apparatus of claim 4 wherein the DoS monitor compares the incremented non-response counter to a monitor threshold to determine if a denial of service attack is in progress.

6. The computer apparatus of claim 5 further comprising a warning message that is sent to a system administrator when the incremented non-response counter exceeds the monitor threshold.

7. The computer apparatus of claim 1 further comprising a monitor enable that can be set by a system administrator to turn on the DoS monitor.

8. A computer implemented method for distinguishing a denial of service attack of a server from a demand spike comprising the steps of:
   receiving a plurality of synchronize connection requests (SYNs) from a client and placing the plurality of connection requests in an accept queue;
   when the accept queue is full, creating a plurality of entries in a dead connection list corresponding to the plurality of the connection requests; and
   adding a timestamp to the entry in the dead connection list for the plurality of connection requests.

9. The computer implemented method of claim 8 further comprising the steps of:
   processing the plurality of entries of the dead connection list that have a time stamp;
   determining which of the plurality of entries are stale where a stale entry is one of the plurality of entries that has a difference between the timestamp and a current time that is greater than a timer threshold;
   removing the stale entry from the dead connection list; and
   sending a reset message (RST) corresponding to the client corresponding to entry.

10. The computer implemented method of claim 9 further comprising the steps of:
    incrementing a non-response counter for each stale entry found in the plurality of entries;
    comparing the value of the non-response counter to a monitor threshold; and
    sending a warning to a system administrator if the non-response counter is greater than the threshold.

11. The computer implemented method of claim 8 further comprising the steps of:
    receiving a final acknowledgment with a four tuple of information corresponding to an entry of the plurality of entries in the dead connection list;
    removing the entry of the plurality of entries corresponding to the four tuple from the dead connection list; and
    sending a reset message (RST) to the client corresponding to the four tuple of information.

12. The computer implemented method of claim 9 further comprising the steps of:
    receiving a final acknowledgment with a four tuple of information corresponding to an entry of the plurality of entries in the dead connection list;
    removing the entry of the plurality of entries corresponding to the four tuple from the dead connection list; and
    sending a reset (RST) to the client corresponding to the four tuple of information.

13. The computer implemented method of claim 8 further comprising a monitor enable that can be set by a system administrator to turn on the DoS monitor.

14. An article of manufacture comprising :
    a denial of service monitor (DoS monitor) that distinguishes between a denial of service attack and a demand spike by making a plurality of entries into a dead connection list when an accept queue is full and holding back sending an RST until the entry is removed from the dead connection list; and
    non-transitory computer recordable media bearing the DoS monitor.

15. The article of manufacture of claim 14 wherein the corresponding entry of the plurality of entries is removed from the dead connection list when an ACK is received corresponding to the entry.

16. The article of manufacture of claim 14 wherein the corresponding entry of the plurality of entries is removed from the dead connection list when the at least one entry has been in on the dead connection list for more than a specified stale time.

17. The article of manufacture of claim 14 wherein the DoS monitor increments a non-response counter each time the corresponding entry is removed from the dead connection list after being on the dead connection list for more than the specified stale time.

18. The article of manufacture of claim 14 wherein the DoS monitor compares the incremented non-response counter to a monitor threshold to determine if a denial of service attack is in progress.

19. The article of manufacture of claim 14 further comprising a warning message that is sent to a system administrator when the incremented non-response counter exceeds the monitor threshold.

20. The article of manufacture of claim 14 further comprising a monitor enable that can be set by a system administrator to turn on the DoS monitor.

* * * * *